(12) United States Patent
Fu et al.

(10) Patent No.: US 7,010,580 B1
(45) Date of Patent: Mar. 7, 2006

(54) METHOD AND APPARATUS FOR EXCHANGING DATA IN A PLATFORM INDEPENDENT MANNER

(75) Inventors: Xiang Fu, San Jose, CA (US); Roy Campbell Stafford, Mountain View, CA (US)

(73) Assignee: Agile Software Corp., San Jose, CA (US)

( * ) Notice: Subject to any disclaimer, the term of this patent is extended or adjusted under 35 U.S.C. 154(b) by 513 days.

(21) Appl. No.: 09/685,417

(22) Filed: Oct. 10, 2000

Related U.S. Application Data

(60) Provisional application No. 60/158,687, filed on Oct. 8, 1999.

(51) Int. Cl.
G06F 15/16 (2006.01)
G06F 17/00 (2006.01)
G06F 7/00 (2006.01)

(52) U.S. Cl. ...................... 709/217; 707/104
(58) Field of Classification Search ................ 709/217; 707/1–10, 100–104.1, 200–206; 705/1–45, 705/50–80, 400–418
See application file for complete search history.

(56) References Cited

U.S. PATENT DOCUMENTS

| 5,265,221 | A | * | 11/1993 | Miller | 711/163 |
| 5,276,870 | A | * | 1/1994 | Shan et al. | 707/2 |
| 5,911,143 | A | * | 6/1999 | Deinhart et al. | 707/103 R |
| 5,941,957 | A | * | 8/1999 | Ingrassia et al. | 709/248 |
| 6,618,754 | B1 | * | 9/2003 | Gosling | 709/220 |

* cited by examiner

*Primary Examiner*—David Wiley
*Assistant Examiner*—Arrienne M. Lezak
(74) *Attorney, Agent, or Firm*—Stevens Law Group

(57) ABSTRACT

Provided is a system and method for easily packaging and exchanging complex information such as that contained in a database in the form of objects and attached documents. The invention may include a server configured to create a viewer package containing data and viewer code that allows a client computer to read data within the viewer package. The viewer code provides a client computer with the ability to perform functions that are as robust and as useful to common functions of a database for viewing, consuming and manipulating data. The data to be accessed may be formatted in one or more universal formats so that a user opening the viewer package can access the data, independent of the medium onto which it is received.

10 Claims, 13 Drawing Sheets

FIG. 9

| Item Number | Revision | Description |
|---|---|---|
| 800028-0001 | 02 | PC ASSEMBLY, UDP MODULE, OPTICAL TX, REV 83 |
| 800028-0001 | 50 | PCB, UDP MODULE, OPTICAL TX, REV 83 |
| 290826-0001 | 50 | LABEL, SERIAL NUMBER, 125X1.5 |
| 330013-0001 | 01 | SCHEMATIC, UDP MODULE, OPTICAL TX, REV 83 |
| 310026-0001 | 50 | VACANT LOCATION |
| 000000-0000 | 50 | CAP, 0.01UF, 50V, 10%, 0805, X7R |
| 100091-0040 | 50 | COIL, CHIP, SERIES 1210, 1.5UH |
| 100137-0027 | 50 | SPLITTER/COMBINER, 2-WAY 0', 2MHZ-500MHZ, WATERPROOF |
| 100184-0102 | 50 | BEAD CORE, 8MB, 115 OHM @ 100MHZ, +/-25% |
| 100198-0003 | 50 | TRANSISTOR, 8MD, SOT-23 PKG, NPN, 40VCEO, 100/300 HFE |
| 100291-0014 | 50 | CAP, 47PF, 50V, 10%, 0603, NPO |
| 100392-0010 | 50 | CAP, 58PF, 50V, 10%, 0803, NPO |
| 100392-0011 | 50 | CAP, 1000PF, 50V, 10%, 0803, COG |
| 100392-0028 | 50 | RES, SMD 0805 1/1 DW 100V +/-5%, 20 OHM |
| 100428-0040 | 50 | RES, SMD 0805 1/1 DW 100V +/-5%, 51 OHM |
| 100428-0050 | 50 | RES, SMD 0805 1/1 DW 100V +/-5%, 100 OHM |
| 100428-0057 | 50 | RES, SMD 0805 1/1 DW 100V +/-5%, 470 OHM |

FIG. 10

Browser window showing PDX Package - Test_72899

Tree navigation:
- 300028-0001 - PC ASS
- 300028-0001 - PC ASS
- PC00190 - Release of r
- PC00191 - Update Prep

Package Attributes

| Attribute | Value |
|---|---|
| ID | Test_72699 |
| Date Originated | 07/26/99 |
| Originator | JRR |
| Description | |

☐ Editable

Files Attached to All Objects:

| File Name | File Description | Object Attached To |
|---|---|---|
| 280002i2rt.zip | Board Zip File | 280002-0002-PCB,UCB MODULE, RX-300 |
| 400036-0001-SH1.dwg | Assembly Drawing | 400036-0001-BRACKET, RX-300-OPTICAL |
| 400049-0001-SH1.dwg | Assembly Drawing | 400049-0001-FACEPLATE, RX-300 |
| 330027-0001-SH1.dwg | Assembly Drawing | 330027-0001-LABEL, RX-300 |
| 410005-0001-SH1.dwg | Assembly Drawing | 410005-0001-FACEPLATE ASSEMBLY, RX-300 |
| 400052-0001-SH1.dwg | Assembly Drawing | 400052-0001-FIBER BTACKET, RX-300 |
| 300002-0003 COSTED BOMs 6-18-99.xls | Costed BOM | 300002-0003-PC ASSEMBLY UCS MODULE,RX |
| 300002-0003-4_bid_rwk.doc | Rework instructions | 300002-0003-PC ASSEMBLY UCS MODULE,RX |

FIG. 12

METHOD AND APPARATUS FOR EXCHANGING DATA IN A PLATFORM INDEPENDENT MANNER

RELATED APPLICATIONS

Applicants hereby claim priority based on U.S. Provisional Patent Application Ser. No. 60/158,687, filed on Oct. 8, 1999.

BACKGROUND

The invention generally relates to methods and systems for exchanging electronic data among several locations and, more particularly, to a method and apparatus for storing, packaging and transferring interrelated information among business partners in a manner that obviates the need for functions commonly performed with a database.

Most business entities have a perpetual need to exchange data among other business entities. Manufacturers, for example, have a constant need to interchange their product data among their business partners in order to keep production flowing efficiently. As business arrangements become more complex, it becomes important to carefully organize data that is shared among business partners. Add to this the ever shortening product life cycles, shortening new product introduction schedules and decreasing profit margins in certain product areas. The complexity of the data becomes immense, requiring cross-referencing of many fields of data. This information may include part description information, pricing information, procurement and inventory information, and many other types of information. This all becomes important as manufacturers are now outsourcing more and more products, further depending on outside business partners.

To complicate matters further, these business partners often exchange information electronically on different and incompatible formats. As a result, many businesses resolve this problem by actually exchanging paper documents among themselves. This of course seems absurd in light of modern day advancements in computer technology. However, most businesses that focus on producing products will not easily change their business practices at the administration level in fear of inhibiting their product flow. In order to gain acceptance by businessmen, any new method of exchanging data needs to be simple, easy and timely to implement and adaptable to the company's platform.

One approach is to employ an Electronic Data Interchange("EDI") format. An EDI is typically established between two businesses or entities to securely exchange data. One of the problems with this method is that it is limited to two parties. Another problem is that it is very complicated to implement, having a very extensive protocol standard to which each party must adhere. Moreover, the EDI system has a very high cost and is not flexible to changes in the business. This is not helpful for diverse business relationships having multiple partners. This also makes it difficult to share information, especially when multiple partners contribute information among a complex supply chain of product parts. In the end, the host of the information being used in the supply chain must dictate how the information is distributed by establishing certain business relationships.

For example, an original equipment manufacturer (OEM) can contract to a multitude of contract electronic manufacturing (CEM) companies, also known as electronic manufacturing services (EMS) which collaborate to develop a product, subcontracting parts to different companies. These relationships can form a complex chain of business agreements that require information to be passed among the companies according to the individual agreements. Typically, the OEM governs how the business chain is set up among the multiple partners and dictates how information is passed among the business partners. It can also be the case, however, that information emanates from another part of the supply chain, such as a EMS, which may develop a part, the design of which other partners depend upon for their development. In such situations, information pertaining to the product and its individual parts must flow among the partners in a tightly regulated manner, limiting access to certain confidential information to particular partners. Each partner typically needs to consume the information, including extracting data for use in other software applications. One such application needed in business is accounting applications, such as Microsoft Excell™. Businesses like to organize and use product data for accounting purposes, procurement, inventory and many other business functions. Accomplishing the sharing of information while performing these tasks electronically is very difficult, since the partners would need to exchange information amongst them while maintaining each other's trade secrets and confidential information.

Another approach is to allow access to a host database that contains information pertaining to the product line. The major advantage of using a database is that it allows access to a large amount of information in real time. Furthermore, a user that has access to the database can run a program to access data according to certain parameters, allowing the user to gather information according to its own parameters. Mutual access to a database also allows an exchange of data between parties by allowing each party to make certain modifications to data including adding data and deleting obsolete data. Controls can be implemented in order to maintain the integrity of the data among the parties using the database. Also, interrelated information may be searched for and organized under predetermined criteria so that a user can view, manipulate and consume the data in a useful manner.

Unfortunately, there are downsides to using a database that render such an application cumbersome and expensive. First, the data in a database is not easily transportable. All users would need access to the database by some means, such as Internet access or some type of dedicated link such as an EDI as discussed above. Worst of all, access to a database is not very flexible to incompatible systems that may want to access the database and retrieve data. It turns out to be a very expensive and time consuming task, both in terms of man-hours and hardware implementation, to establish such a system. It is also difficult to maintain the integrity of the data, especially in environments of multiple users.

The functionality of accessing large amounts of information that a database provides, however, is extremely useful for gathering and sorting through data. And, in most applications, not all of the functionality that a database provides is required. For example, a product supplier may not need real time data that pertains to a particular part being manufactured. In this example, only a "snap-shot" of the database is required in order to deliver the relevant information to the parts supplier. Furthermore, a product parts supplier typically needs only a subset of the total product information in order to produce a part. Therefore, only a snap-shot of relevant objects in a database is necessary. A parts supplier also may not need to exchange information with a final product producer, obviating the need to directly access the database. It would be useful, though, if the parts supplier could consume and manipulate a subset of the data as it would if it actually had access to the database. It would be very useful, for example, if a parts supplier could have access to a subset of the data contained in the database along with the ability to consume and manipulate the data. If this could be delivered to a parts supplier without the need for a direct link to the database, the owner of the information can retain the integrity of the data and yet allow a parts supplier to consume the data and to efficiently produce the parts.

Some applications provide the ability to separately send a snapshot of a text document and allow text editing, such as Adobe Acrobat™ products, including the well known Portable Document File (PDF). Such applications, however, do not provide the ability to easily access a variety of information. They simply offer the ability to send and receive plain documents, without the ability to peruse, manipulate and consume data in a useful manner. In some applications, these types of files may be sent via email, shipped to a remote location on a memory device such as a CDROM or a floppy disk, or actually printed out and sent to the remote location. All of these methods are time consuming and do not provide an accurate or robust supply of information to a remote location.

Therefore, there exists a need for a method and apparatus that can centralize information, maintain trade secrets and confidentiality among business partners and allow access to certain information according to established privileges in an organized, controllable and useful manner, and to operate in a platform independent manner. Such a product would obviate the need for direct access to a database for access to the information and avoids the need for complex individual agreements between business partners that dictate the sharing of data related to each partner's trade secrets and confidential information. As discussed below, the invention accomplishes this in a unique and elegant manner.

SUMMARY OF THE INVENTION

The invention is directed to a system and method for easily packaging and exchanging complex information such as that contained in a database in a software package that organizes the data in the form of objects and attached documents. This gives an end user access to the data without the need for direct access to a database. The invention may include a server that is configured to allow a user to create a viewer package containing data and viewer code in which an end user or client computer is able to read data within the viewer package. The viewer code provides a client computer with the ability to perform functions that are as robust and as useful as common functions of a database for viewing, consuming and manipulating data. The data to be accessed may be formatted in one or more universal formats so that a user opening the viewer package can access the data, independent of the format of the medium onto which it is received.

The method may include the ability to exchange a type of "snap-shot" of information that may be taken from a database and organized in a medium in the form of software objects and related text and attached documents. These objects and documents may then be accessed by the remote end user for review, consumption and manipulation of the information in a useful manner. The information may be limited according to privileges set by the creator of the viewer package. Accordingly, the end user of the viewer package may be limited to access to certain information, may be limited to a read-only version, or may be subject to other limitations in the use or access of the information contained in the viewer package. The result is a method and device that allows for the access of a large amount of data in remote locations in a manner that obviates the need for direct access to the functions of a database.

BRIEF SUMMARY OF THE DRAWINGS

Figure 12:
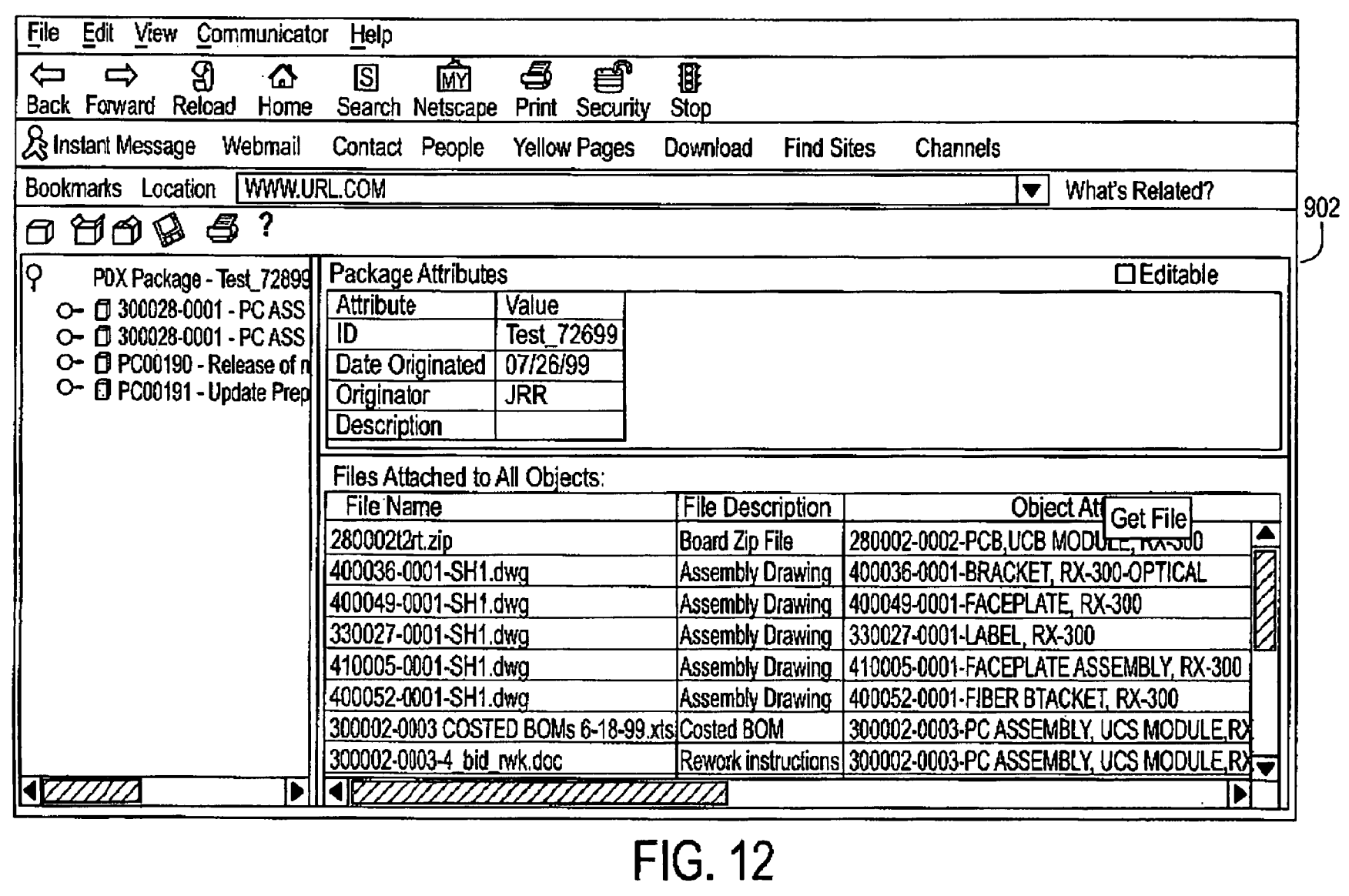

FIGS. 9–12 are examples of web pages illustrating the user interface to use in accordance with the invention;

DETAILED DESCRIPTION OF THE INVENTION

Figure 1:
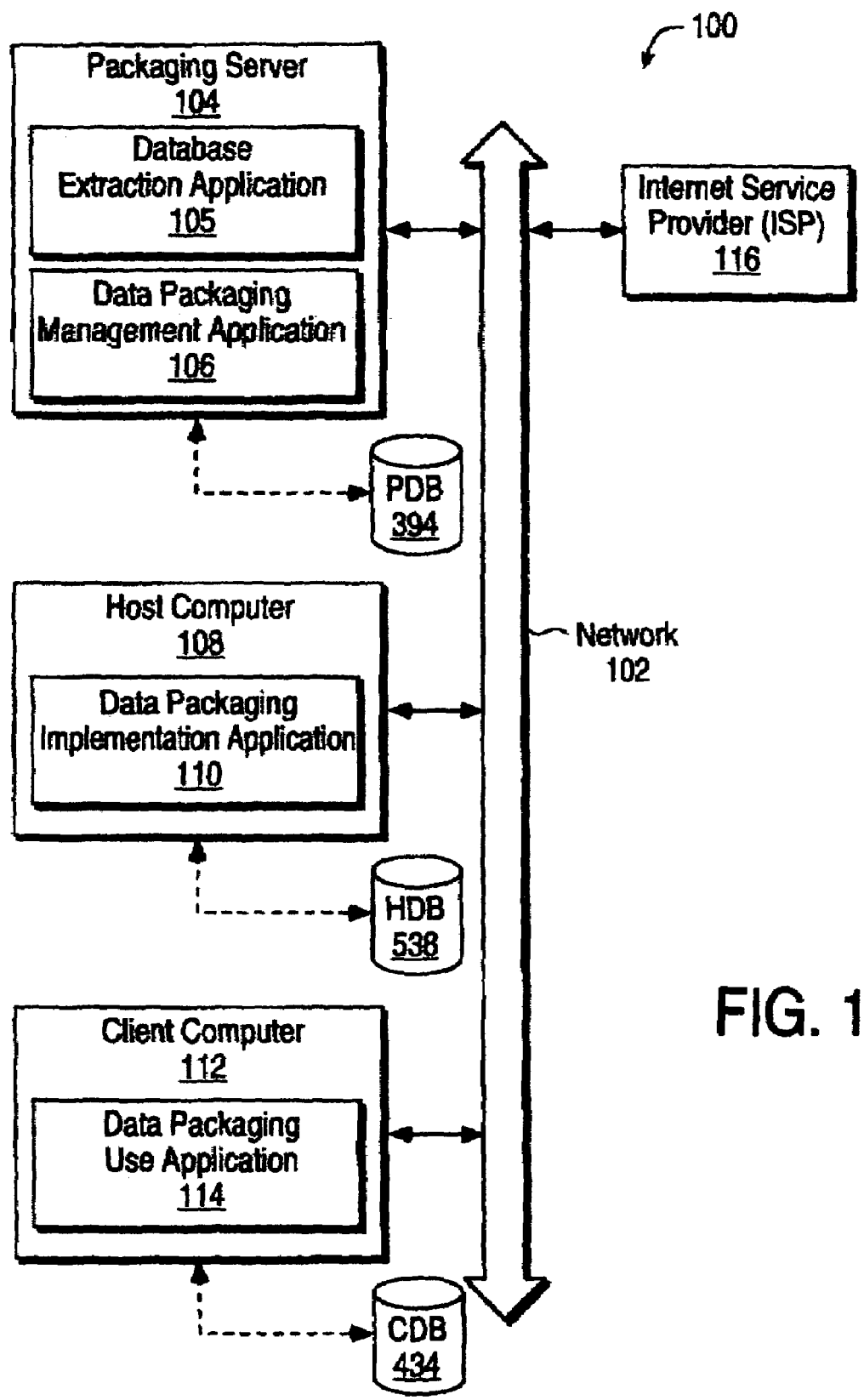
FIG. 1 is a block diagram of a system for creating and transferring a viewer package in accordance with the invention.

The invention is directed to a system and method for easily packaging and transferring information in the form of objects and documents in a robust manner that obviates the need for direct access to a database or other storage device. Further provided is a way to provide controlled access to the information by a user according to predetermined privileges set by the owner of the information, or host. Examples are described below that pertain to the exchange of information while producing a part for a manufacturer. It will be appreciated, however, that this is illustrative of only one utility of the invention, and that the invention has greater applicability. Unlike devices in the prior art, the invention allows access by recipients of the viewer package, or clients, of individual objects and associated documents stored in association with the viewer package. The invention is particularly useful in helping entities such as original equipment manufacturers (OEMs) and contract equipment manufacturers (CEMs) share information when producing products and associated parts throughout a product supply chain without the need for the CEMs, or clients, to access an entire database.

The invention may include the utilization of dedicated processors, webservers configured to receive and route browser requests, application servers, state servers and other types of computer processors configured to communicate amongst each other and that may be connected to one or more networks, including a Local Area Network (LAN), an intranet and the Internet. However, it will be appreciated by those skilled in the art, such implementation of such devices and systems are but few illustrations of the utility of the invention, and that the invention may have greater applicability and utility in many other applications where efficient routing and processing of data within one or more networks is involved. Equivalent structures embodying the invention could be configured for such applications without diverting from the spirit and scope of the invention. Although this embodiment is described and illustrated in the context of devices and systems for exchanging data among users of a computer system or network, the invention extends to other applications where similar features are useful. The invention may include personal computers, application servers, state servers or Internet webservers that are designed and implemented on a computer and may be connected to a network for communication with other computers to practice the invention. A system configured to operate according to the invention may include a plurality of personal computers connected to the Internet via individual modems or other communication means such as wireless communications.

The invention may also involve a number of functions to be performed by a computer processor, such as a microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention, which is defined by the appended claims.

Within the different types of computers, such as computer servers, that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, nor any commonly used protocol for storing and retrieving information to and from these memory devices respectively.

Referring to FIG. 1, a data transfer system 100 is illustrated that includes a number of computer entities connected to network 102 so that they can communicate. Packaging server 104 is connected to network 102 and is configured to create viewer packages that may be accessed by an end user. The viewer package may be a product data exchange package, known in the art at PDX packages. These types of packages may or may not conform to standard specifications developed by NEMI, a nationally known standards committee.

The packaging server includes a database extraction application 105, which is computer readable code stored on an electronic medium. The code is executable by a central processing unit (CPU) controlling the extraction functions. The packaging server further includes a data packaging management application 106 that is configured to package the data created by the extraction application 105, possibly along with actual data from a packaging database 394. The resulting viewer package can be sent via network 102 to users. Using the viewer package along with viewer code downloaded from the package database, the client user can access data that is formatted according to the universal format. The user can browse the data in a manner that obviates common functions of a database, giving the user access to a large amount of data in an easy to read fashion.

A host computer 108 is connected to network 102 and includes a data packaging implementation application 110. The implementation application is configured to enable a host user to access the packaging server 104 in order to create a viewer package that can be sent to a user. This package gives the user access to a large amount of interrelated information and the means to view, manipulate and consume the information. The manner in which the information is organized allows the user to access many layers of information according to their relation to other information contained within the viewer package. Links to the information contained within the viewer package allow a user to travel through different layers of the information as they relate to other information within the package.

For example, if the information related to a product part to be manufactured, a user The information can be copied, transferred, and manipulated by a user within other software applications such as Microsoft Excell™, Quickbooks™ and other applications. Prior to the invention, a user would need to be connected directly to a database in order to perform such functions with data.

In one embodiment of the invention, a user can also redline or otherwise mark up the data appearing in the package and send it back to the host. This gives both parties a useful medium on which to communicate. One embodiment of the invention may enable the end user and the host to transfer similar copies of a data package between themselves, each possibly acting interchangeably as hosts and end users. The embodiment may include the ability to add, delete, manipulate and otherwise change the data in the viewer package. Redline versions may also be available to allow each party to track changes in the data made by the other party. The possibilities of embodiments of the invention are vast.

Implementation application 110 is configured be executed by the host computer 108 to enable it to communicate with the packaging server 104 in creating a viewer package. Host computer 108 further includes a host database 538 for storing data to be configured under a universal format in order to make the data adaptable to the viewer package and transferred to a client user. As discussed in more detail below, the data in host database 538 can be transferred to a user in a number of ways including an E-mail attachment, CD ROM, file transportation protocol (FTP), and other data transmission means, including combinations of the various forms of data storage. The implementation application 110 may be transferred to the host computer via the network 102 and ISP 116. It can also be sent via some other means such as a CD ROM, an E-mail attachment or other means.

A client computer 112 communicates with packaging server 104 and host computer 108 via the network 102 to receive viewer packages and to receive code for accessing the viewer packages. Data packaging use application 114 is ultimately stored in memory in the client computer. The use application contains computer readable code that is executable by a CPU when a client user is using a viewer package and associated data. According to the invention, a client user can receive a viewer package that includes data or that is associated with data that is stored in another file or another medium such as a CDROM, a client database, CDB434, or some other medium.

In one embodiment of the invention, a host computer may access the packaging server in order to create a viewer package having code that, within certain parameters, allows a client computer 112 to access, consume and manipulate data associated with the viewer package. Once a viewer package is created, it is readable by a client computer executing code that defines the parameters within which the client computer will access data in the viewer package. The code may be downloaded to the client computer via the packaging server or sent by some other means. The actual data is delivered to client computer 112 as part of the viewer package. However, especially when large amounts of data are being used, other means of delivering the data may be required. For example, one or more CDROMs containing a large amount of data can be delivered to the client computer and physically loaded onto the client computer. The code can then be downloaded to the client computer via Internet service provider 116, providing code that allows the client computer 112 to view, manipulate and consume data within the package without the need for access to a database. The data delivered to the client computer can be loaded in memory such as RAM, DRAM, a client database 434, or some other digital data storage medium accessible to the client computer. Once the client computer has the viewer package along with the code from the packaging server, it can access the data for viewing, consumption and manipulation. The downloaded code allows the client user to view, modify or otherwise consume the data in a manner that obviates the need for direct access to common functions of a database. These functions include extracting and parsing data according to the hierarchy in which the data is organized and gathering data according to certain identifiers embedded in the data.

The client computer 112 may be required to access packaging server 104 via ISP 116 and be verified to download the code required to open up the viewer package. The code downloaded from the packaging server to the client computer could possibly be an encryption key such as a password or a user ID. This would provide security for the data contained in the viewer package or stored in another source. This further allows for further control by the packaging servers, which are allowed to use the data packaging functions, the database extraction applications and the data itself.

It also may be the case that the client may want to perform the same functions as the host computer, and vise versa. In this configuration, modifications of a user package may be appropriate to send back to the host to give it feedback, to offer change proposals, etc. There may be applications that may or may not be limited in function, providing end users or clients limited ability to create or modify packages and send them back to the host. For this, the client may need the applications present on the host computer so that it can perform the same or similar functions. There may also exist the ability for the client to forward the package itself to other clients for consumption. The client may modify a package sent by a host and subsequently send it to another client. This could be useful for business partnerships where the product line includes hierarchies of manufacturers and suppliers that supply each other with goods and services. For example, a parts supplier may want to forward certain information to a contractor of lesser component parts and give the contractor limited access to the information. Many configurations are possible in employing the invention, which may include functions that share characteristics of the host and the client, or that interchange their roles in the process. Such configurations are contemplated by the invention in their various forms.

The host computer 108 and client computer 112 may be any one of a number of personal computers configured to execute software code. Using a mouse manipulating a cursor and a keyboard for inputting data, the user may operate the computer. Each computer may further include a modem connected via a communication link to network 102 for communicating among other network members. The communication link can be any one of a number of communication links including a telephone line, wireless communication device or a common networked computer system. Network 102 may be any one of a number of network systems including a telephone system, a cellular network system or a local area network (LAN) system for exchanging and transferring information. Either of these networks can be connected to the Internet via a Internet service provider (ISP) 116 shown in FIG. 1. The primary purpose of the ISP is to allow computers connected to the network to communicate via the Internet with other computers.

The procedures described in connection with the flowcharts set forth below are performed by microprocessors executing software code that is made up of electronic or digital forms of data. The code is executable by a CPU performing the device's functions to accomplish the creation of an object and other associated information in accordance with the invention. The creation of the code and the routines developed to enable the CPU to perform the tasks are done using methods well known to those skilled in the art. However, the ability to parse out and otherwise consume data by the client is accomplished by a unique application of the XML format in conjunction with Java™ based program code. Java™ is a portable code. This means that it can inter-operate amongst almost any format. Similarly, XML is a portable data structure format. This means, it is interpretable in almost any data processing system. XML is a well known ASCII format, which is understood by those skilled in the art of computer programming and design. The combination of these two portable applications is unique in that the universal format combines the flexibility of XML with the power of Java™ code. The result is a single portable application that allows the exchange of data among business partners in an efficient and inexpensive way.

Figure 2:
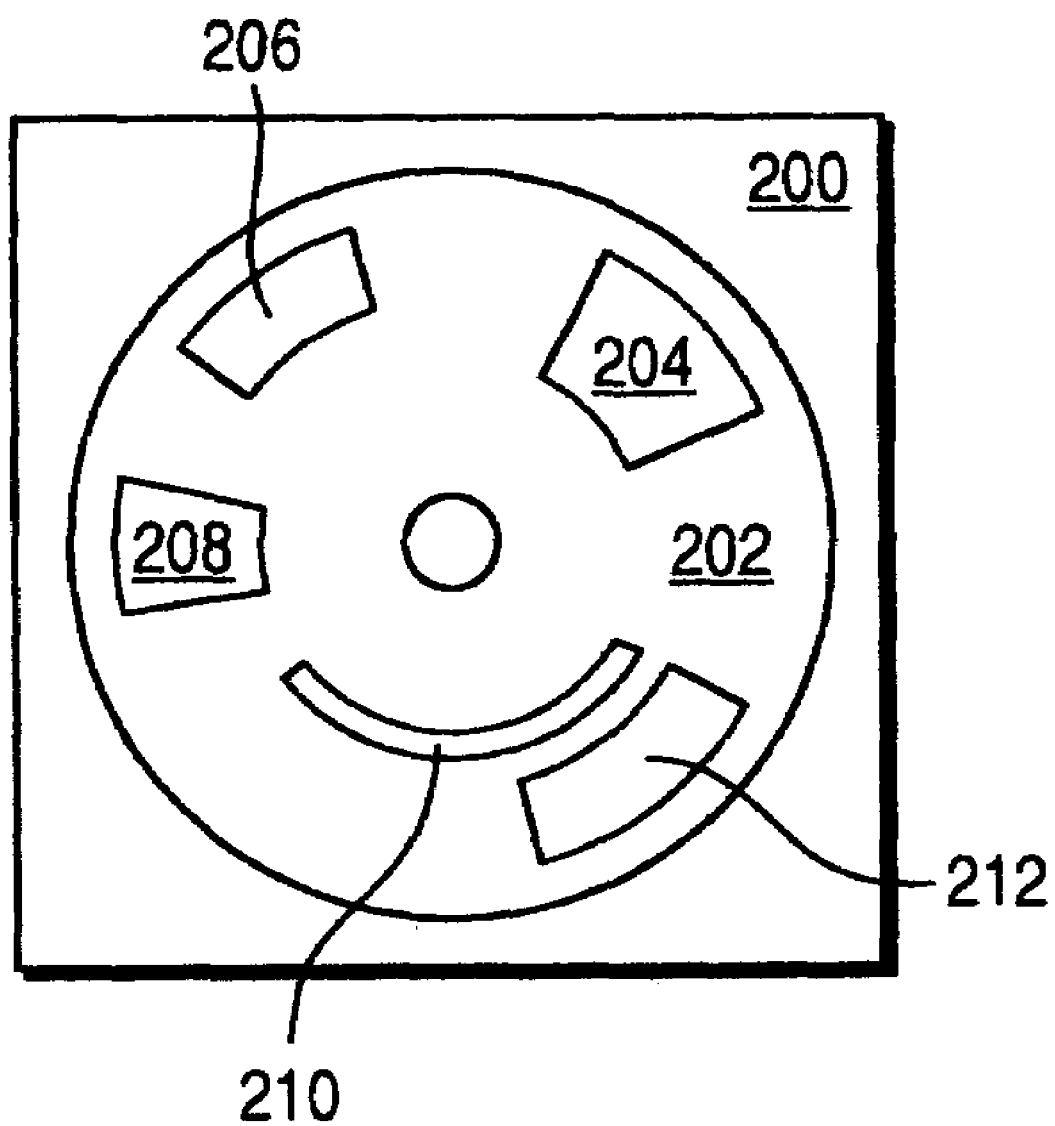
FIG. 2 is a block diagram of a common magnetic disk media for storing data.

Those skilled in the art will appreciate that FIG. 2 illustrates preferred structures of the computer program code elements that function according to this invention. Preferably, the invention is practiced in its preferred embodiment by a machine that renders the computer program code elements in a form that instructs a digital processing apparatus (i.e., a computer) to perform a sequence of functional steps corresponding to those shown in FIGS. 6, 7 and 8 discussed below. The machine is shown diagrammatically in FIG. 2 as a combination of program code elements in computer readable form that are embodied in a computerusable data medium 202 such as a computer diskette 200. As mentioned above, however, such media may also be found in semiconductor devices, on magnetic tape and on optical disks. Each of the code elements 204–212 may be program means for directing a digital processing apparatus to facilitate some portion of the method by which this invention is practiced. Even when no single code element 204–212 includes the complete method, two or more of the code elements together may comprise all of the program means necessary to facilitate the practice of the invention.

The data to be accessed by a client may be delivered to the client in a number of ways. If it is manageable enough, it can be sent through the Internet by an email attachment. The email attachment can then be opened by the client end user and accessed for use. The package could be stored on various memory devices within or connected to the client computer.

A package could also be delivered by a CDROM to be installed in the client computer. The viewer package also may be downloaded and stored in either the client database 434, the host data base 538 or the packaging database 394, depending on how the client user wants to use the viewer package. The client can access the data in these databases in a number of ways as well. A client can access a database via the Internet by accessing ISP 116 and downloading data from a remote database such as the packaging database 394 or the host data base 538. The client could also be connected to these databases by a local area network (LAN) or by other communication means in order to perform various functions. For example, if the client is configured to act as a host computer with the ability to create packages, access to the databases may be useful, or even required.

However the data is stored, it may be organized by data objects that represent the information contained therein. For example, if a part of a product were to be represented in a database, the object may be identified by the part number or other identification and could contain attributes that define or describe information relevant to the part. Generally, objects link together different types of information such as attributes and related documents. Objects can be of different types such as field types, which may describe an item such as a product part, links that associate an object with other objects or documents and other types that are helpful in describing or defining an object or related information. Objects may be organized in sets of objects that are related by common attributes or some other affiliation. If properly defined, objects can be very helpful in identifying related information in a logical manner. For example, a part could have associated with it an object identifying the part, as well as other objects that describe the part in the context of the final product. The part could also have affiliated with it a bill of material (BOM), a change order, and other files relevant to the part or the final product. In accordance with the invention, the data delivered with the viewer package may be configured to preserve all of the logical relationships among the objects retrieved from the source from which the data originates, such as a data base, and can be viewed, consumed and manipulated in a useful manner.

According to the invention, each object may contain associated attributes that define or describe the object or the subject matter to which it pertains. Other attributes match or link other information to the object. For example, a part may have associated with it a part object, a BOM, change orders, a text document, specification drawings, and other attributes. The part object could describe or define basic characteristics of the part such as part number, color, size, type, etc. A BOM could describe different fields that a typical bill of materials may have such as price, quantity, find number, delivery status, cross references etc. The BOM may also include links to other objects that pertain to related information relevant to the individual information fields within the BOM. Change orders may include any proposed changes to earlier revisions of the part and may even include a history of changes. A text document may be attached to the object to include any textual materials relevant to the part or its manufacture. A graphics drawing could also be included with the part object to provide graphical representations of the part, the final product, or any other useful visual aide. Other attributes may be associated with the object to help provide information relevant to the part.

The invention allows access to theses objects and their related attributes by client users having certain privileges to access the data. For example, the code delivered for use with the viewer package may include certain functional capabilities such as the ability to view data, add data, delete data or create a redline version of the changed data. A host user can limit privileges within the code that omits certain functions in order to limit the client's access to the data. The client, for example, may not need to change the data, it may only need to read the data and view attached documents. This would require a smaller viewer package, possibly making it easier to exchange data among business partners. Different levels of access may be established for a given user according to a host's predetermined criteria. An object could even be made invisible to a client user. Furthermore, a host may allow a client user to access and modify any of these objects or related attributes according to the specified privilege criteria set up by the host.

Figure 3:
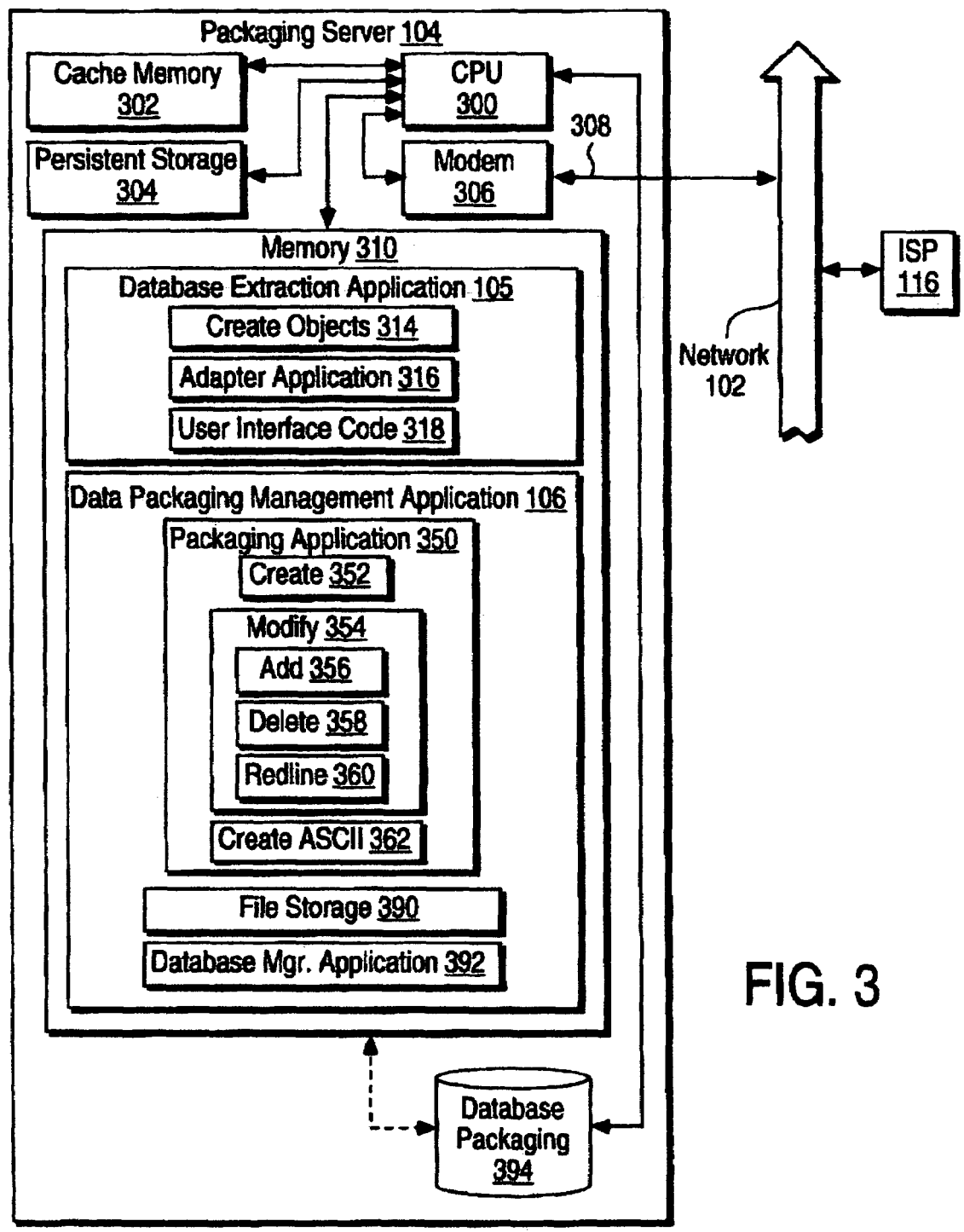
FIG. 3 is a block diagram of the packaging server of FIG. 1 shown in more detail.

Packaging Server 104, also connected to network 102, is configured to package and transfer data associated with objects, documents and other information and to provide controlled access to information by recipients of the viewer package. It is accessible by users on the network system 102 that have access privileges. Referring to FIG. 3, a more detailed block diagram of packaging server 104 is shown. The packaging server includes a CPU 300 for controlling the functions of the server and for executing code stored in the various server memories. The cache memory 302, for example, stores data and code that is frequently accessed by the CPU for execution. Typically, data is loaded onto the cache memory 302 from the memory 310 before being executed by the CPU, expediting the loading of the data and code into the CPU for execution. The packaging server further includes a modem 306 communicating with network 102 via a communication link 308. Persistent storage 304 communicates with a CPU to deliver executable code that is frequently used by a CPU.

The packaging server 104 includes a memory 301 containing computer executable code and data storage. Memory 310 may be one of a number of types of digital storage devices such as a random access memory (RAM), a dynamic random access memory (DRAM), a read-only memory (ROM), a static random access memory (SRAM), or other similar data storage devices. Stored in the memory is database extraction application 105 that contains computer executable code. This code provides a host user with the ability to search data in a useful manner. The extraction application includes create objects code 314 which provides a host user with the ability to create objects that pertain to certain attributes and information associated with the particular object. The extraction application further includes an adapter application 316 for adapting a client's system to use the viewer package. User interface code 318 is also included in the extraction application and provides unique and useful windows that are configured to display information to a client user in a robust and useful manner. This user interface code is configured with computer executable code that produces user interfaces when executed by a CPU. The code used is well known to those skilled in the art and are created using methods well known to those skilled in programming user interface code.

According to the invention, the unique way in which data is represented in the viewer package is important for usefully organizing the information needed by the client end user. The Java™ platform, developed by Sun Microsystems, is a software program code format that was created to form a ubiquitous Internet execution environment. An XML application is a universal data format that allows software authors to define their own identification tags which in turn describe the contents of the tags and further make it possible to define a data layer that is reusable. The invention leverages the document structure of and meaning of XML to allow the processing of special instructions on certain parts of the data within the viewer package. According to the invention, these two platforms, XML and Java, provide the functionality that can create the viewer package that can present data to an end user that is as useful as a database, but that is more convenient. Java programs need to be predefined, hard coded formats to configure for reading information. These programs alone are not flexible, making it difficult to extend them or add functionality without completely rewriting the program. Using Java alone, communication with multiple partners having different needs or attributes would be difficult. The computer programs would need to deal with this partner individually. However, using XML, the invention utilizes a standard format for exchanging data among multiple partners. Individual information pertaining to each business partner can be stored in an attributes or a properties file. Therefore, the exchange protocol can be defined by Java and the separate information unique to each partner can be defined by XML. Among the individual business partners, all the information contained in the XML package or file is capable of being modified. Therefore, the XML data format complements the Java™ run-time environment. Java™ by itself provides a great deal of dynamic behavior through its dynamic class loading and reflection mechanisms. XML provides a flexible and extendable tag definition environment that is machine independent. Therefore, Java™ applications coupled with XML data formatting are capable of adapting to data format changes in a generic way, without requiring extensive programming.

The XML platform pertains to document structure with data. This structure outlines a tree network with nodes that describe contents found, metaphorically speaking, in the leaves of the tree. Descriptions of trees, branches and leaves are commonly used by those skilled in the computer programming and design arts to describe methods of organizing data and computer functions. An XML document, unlike simple documents, allows behavior to access the content within the leaves of the tree. Furthermore, URL links may be embedded inside of a document to contain objects. These objects may represent functionality that can be downloaded over the Internet and used to process specific document tags. Java™ code, which is contained within the URL links, may be downloaded via the URL class loader mechanism contained in the Java™ platform. Once the class byte codes are downloaded over the web, a class object is created and temporary object instances are created and used to evaluate the information contained inside the XML file. This provides a mechanism to access information in documents using objects. Java™ programs can also be configured to access information stored inside XML files by analyzing the XML tags contained inside the document.

An important aspect of XML is its ability to use a Java™ program to parse out data from a document. One parser, a document object model (DOM), provides a mechanism to allow users to access information contained in a document in a tree/leaf fashion. Programmers writing such an application specifically leverage the hierarchical structure of a document using the DOM. Another interface is a SAX parser, which is an event-driven method for parsing out information within a document. Using this parser, individual tags are detected by the program that sends callbacks when the beginning and the end of a tag are parsed. Once the program detects a callback, the program is able to discriminate against tag information. This provides a useful method of detecting specific tags located inside a document, rather than parsing out information according to the document's hierarchical structure, like the DOM. These two interfaces provide two methods of parsing out information from a document in two completely different manners.

Still referring to FIG. 3, the packaging server further includes data packaging management application 106 stored in the memory. The management application 106 includes software code executable by CPU 300 for performing the functionality to package and distribute information to be sent to a client user. Packaging application 350 is included in the management application for creating and modifying a viewer package. Create code 352 includes computer executable code that allows the CPU to create a viewer package which includes objects, links to objects and a user interface for creating a viewer package that allows a client user to review and consume data. The packaging application 350 further includes modify code 354 which allows a host user to provide a client user with the ability to modify data that is accessed using the viewer package. The ability to modify can include the ability to add information using add code 356 and to delete information using delete code 358. Redline code 360 can also be included to allow a client user to modify data, leaving behind a redlined version of the data before modification, showing which data was deleted and which data was added. The status of different data can be shown in a manner such as striking out information that was deleted and underlining information that was added. Create ASCII code 362 is also included in the packaging application 350 to allow a host to create an ASCII file that can be easily opened and manipulated by a client user. File storage 390 is included for storing different viewer packages developed under the packaging application 350 for future access.

The management application 106 may also optionally include a database manager application 392 for managing an optional packaging database 394 for storing data to be accessed using the viewer package. Database managers are software applications that are able to maintain and update data within a database. Those skilled in the art will appreciate the need for such utility.

Figure 4:
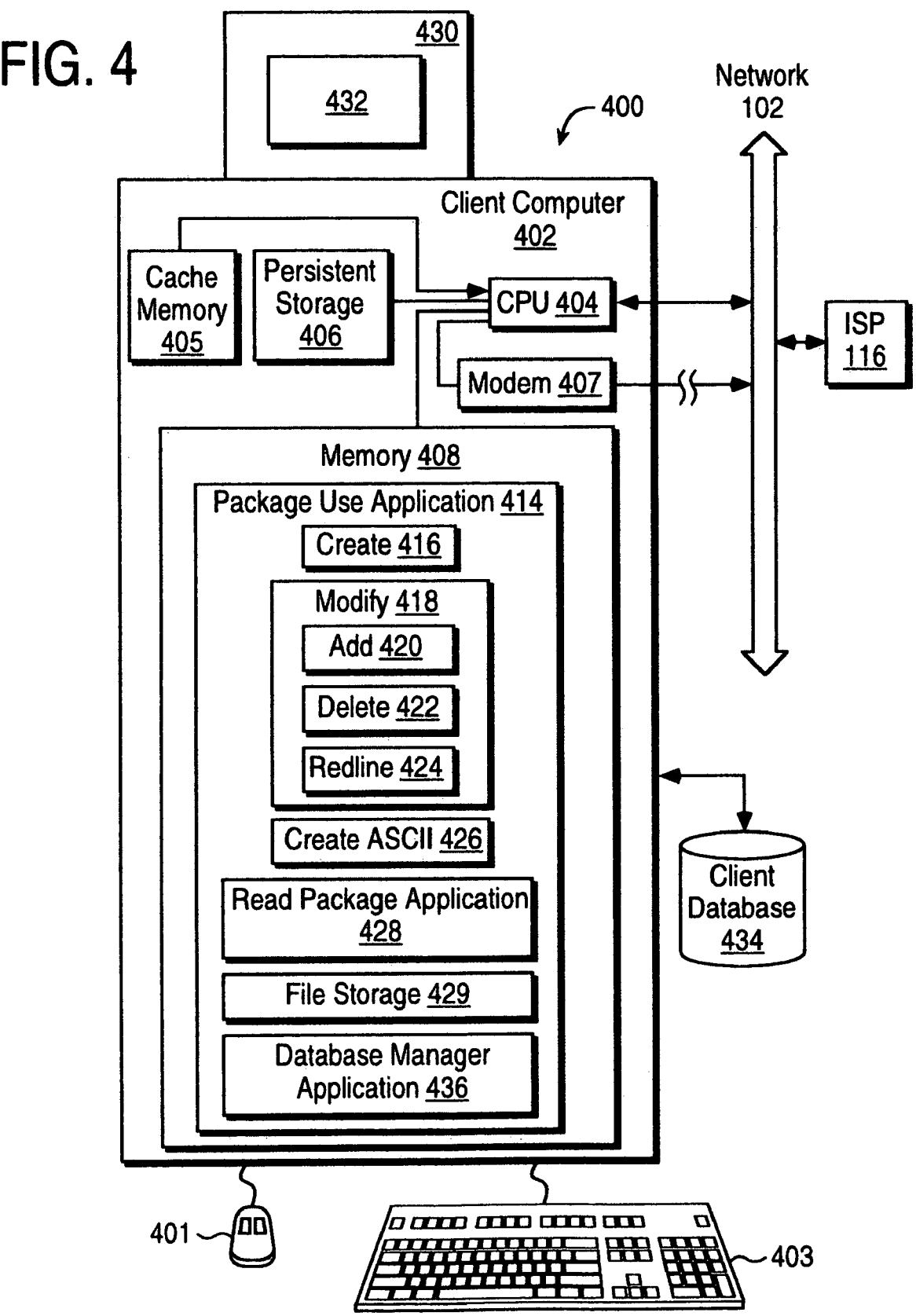
FIG. 4 is a block diagram of the client computer of FIG. 1 shown in more detail.

Referring to FIG. 4, a client computer system 400 is illustrated which includes a client computer 402. CPU 404 is for controlling the functions within the client computer. Cache memory 405 is also included, communicating with the CPU. Specifically, software code is loaded into the cache memory from memory 408 for execution by CPU 404. Persistent storage 406 is also provided for giving the CPU 404 access to commonly used software code. Modem 407 communicates between the CPU and network 102 to transfer or receive data from other entities connected to the network. For example, Internet service provider 116 may be accessed by the modem 407 via the network 102 to communicate on the Internet. Memory 408 includes package use application 414 containing software code that is executable by the CPU to open and consume viewer packages sent by the host computer 108. The viewer package use application includes create code 416 configured to create a viewer package when the code is executed by the CPU 404. This would be used by the client user when and if the client user act as a host in sending a return viewer package to a host or for sending viewer packages to other client users. Modify code 418 is also included in the use application in the event that a client user has privileges to modify data that is sent by a host for access by a host viewer package. In such a configuration, a client user could use the add code 420 for adding information to data files, delete code 422 for deleting data from data files and redline code 424 for showing changes made to data files compared the original information. Create ASCII code 426 is included in the use application for providing an ASCII file for sending information by the client user.

Read package application 428 is included in the use application for reading data supplied by a host user by using a viewer package sent by the host. The read package enables the client user to access the data in a manner that obviates the functions of a database. File storage 429 is configured to store data files that are accessed by the client user and manipulated in certain ways.

In operation, a viewer package is received by a client user and stored in memory 408. This viewer package was created by a host having a client user's attributes and parameters, discussed further below. Using the viewer package along with code from the packaging server, a client user can access data supplied by the host. This data can be sent separate from the viewer package in several different manners. The data could actually be downloaded into a client database 434 which is managed by database manager application 436. This data can be accessed by executing the viewer code and can be searched in a manner that is as robust as a database. The data could also be supplied to the client user by an e-mail attachment or by a file sent by other means, such as a separate CD ROM containing data, and stored in the file storage 429. The client user can then search data stored in the file storage in the same manner as a database.

Figure 5:
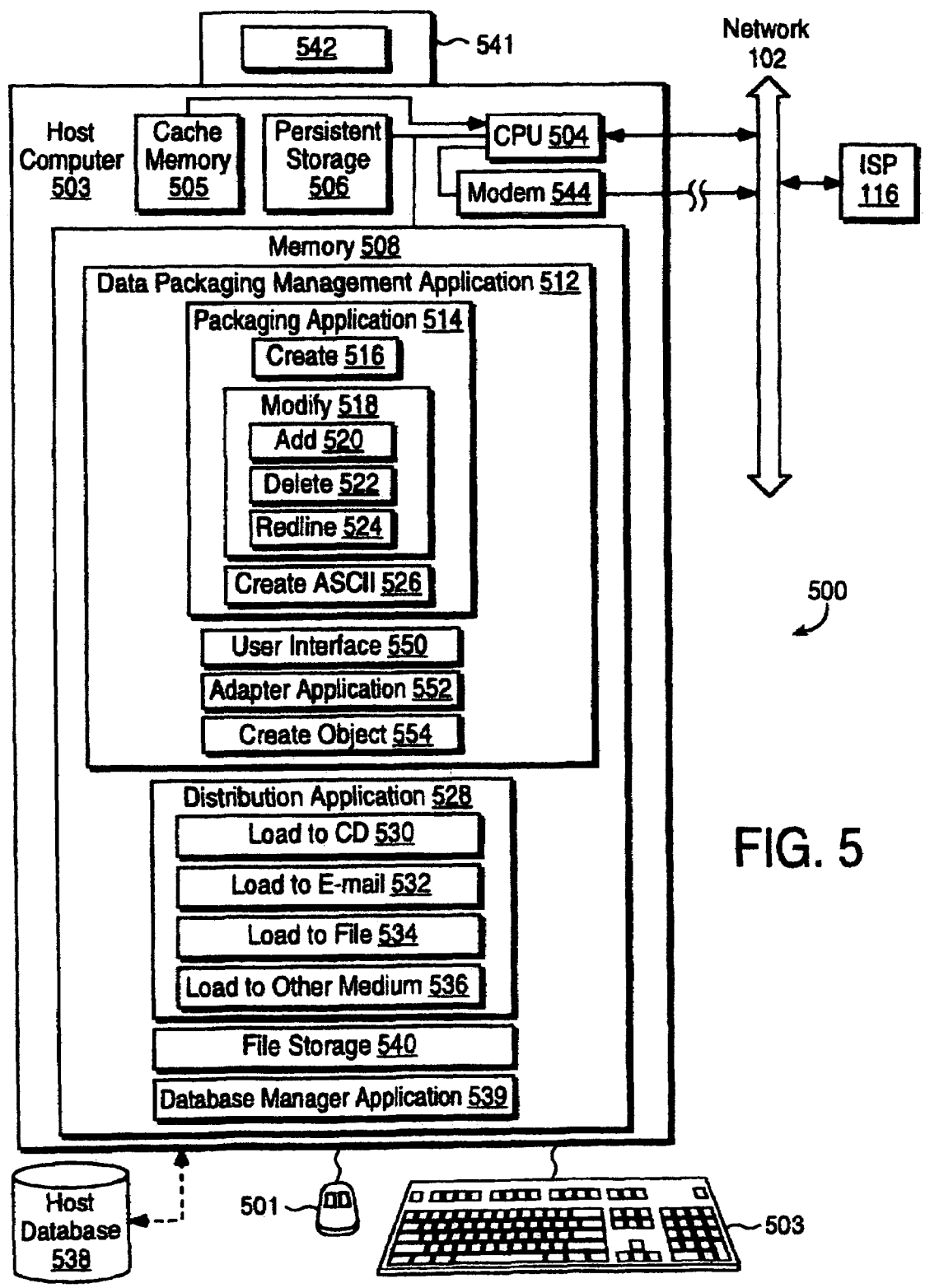
FIG. 5 is a block diagram of the host computer of FIG. 1 shown in more detail.

FIG. 5 illustrates a block diagram of a host computer system 500 that includes a mouse 501 and a keyboard 502 for allowing a client user to communicate with host computer 503. The host computer further includes a CPU 504 for controlling the functions of the host computer. CPU 504 is connected to cache memory 505 for temporarily storing code to be executed by CPU 504. In operation, software code is loaded onto cache memory 505 from memory 508 prior to being executed by CPU 504 in order to expedite the transfer of data. Persistent storage is included to store code that is frequently executed by the CPU. Both the cache memory and persistent storage allow easy access to information by the CPU, which can be faster than access of the memory 508.

Memory 508 includes data packaging management application 512 that allows a host computer to access the packaging server 104 and create a viewer package. The CPU is connected to modem 544 that communicates with network 102 to communicate with other entities connected to the network. For example, Internet service provider 116 provides a connection between the host computer and the Internet to so that data and code can be exchanged with other users connected to the Internet. Packaging application 514 allows a host user to create a viewer package according to a particular client user's attributes and privileges. Modify code 518 allows a host user to add and delete information from a particular viewer package. The modify code further includes redline code 524 for showing changes in data over time period. Create ASCII code 526 is included in the packaging application for packaging an ASCII file to be sent to a client user.

Distribution application 528 is included in the management application to allow a host user to load data by different means. For example, load to CD code 530 allows a host user to load data onto a CD ROM to be sent to a client user. Load to E-mail code 532 allows a host user to load data onto an email to be sent to a client user. Similarly, load to file code 534 allows a host user to load data into a file to be sent to a client user along with the viewer package. Load to other medium code 536 allows for other types medium to be used to send code to a client user.

File storage 540 allows a host user to store code files and data files to use while creating a viewer package. A host database 538, managed by database manager application code 539, can be optionally included with a host computer to provide a storage space for data to be sent to a client user. Software code related to database extraction is also included in memory 508 and includes user interface code 550. The interface code 550 includes software code for providing a user interface for a host user, allowing a host user to interact with the computer using mouse 501 and keyboard 502 to input data necessary to create a user package. This allows a guest user to manually input data and to extract data from host database 538 to be included in the user package. The user interface 550 further aids a host user in downloading information from packaging server 104 that is necessary to create a user package. Adaptor application 552 is included for adapting incoming data from the packaging server so that the host computer 503 can process the data for use by a host user creating a package. Create object code 554 is also included so that objects can be created as they are displayed by a user interface in order to organize data in a useful manner.

Figure 6:
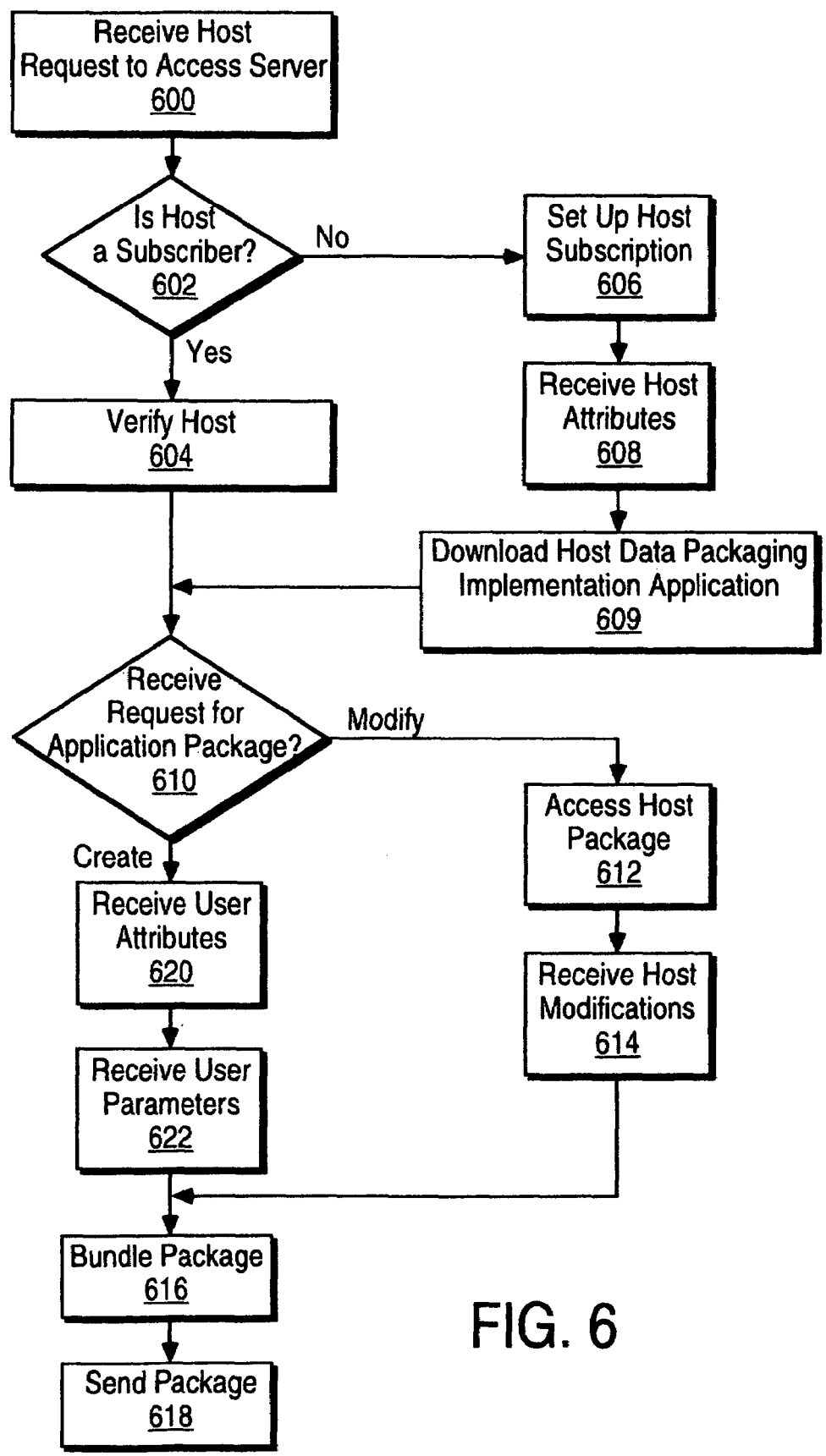
FIG. 6 is a flow diagram illustrating a method of creating or modifying a viewer package in accordance with the invention.

Referring to FIG. 6, an operation from the packaging server's point of view, the packaging server receives a request from a host user in step 300 to access the packaging server. The packaging server then queries whether the host is a subscriber to the system in step 602. In this query, the packaging server verifies the host's subscription by receiving the host ID and possibly a password that gives a host user access to the server. If the host is a subscriber, it is verified in step 604. If the host is not a subscriber, then a subscription must be set up in step 606. In this process, the server receives the host's attributes in order to identify the host. Once that is completed, a host data packaging implementation application is downloaded in step 609 so that the host can access a server and create a viewer package. In the next step 610, the request for a viewer package is received by the server. Here, the host user has two options, whether to modify an existing viewer package or to create a new viewer package. If the host requests to modify a certain viewer package, the process advances to step 612 for accessing an existing viewer package. In step 614, the server receives the host modifications. The server then allows a host user to bundle a viewer package in step 616 and to send a viewer package to a client user in step 618. If, however, a host user wishes to create a new viewer package, the server then receives the client user attributes in step 620 to identify the user to which the viewer package will be sent. In step 622, the server receives the client user parameters which define the extent to which a client user may search the host's data. Similar to the modify steps, the newly created file is bundled in a viewer package in step 616 and sent to a client user in step 618.

Figure 7:
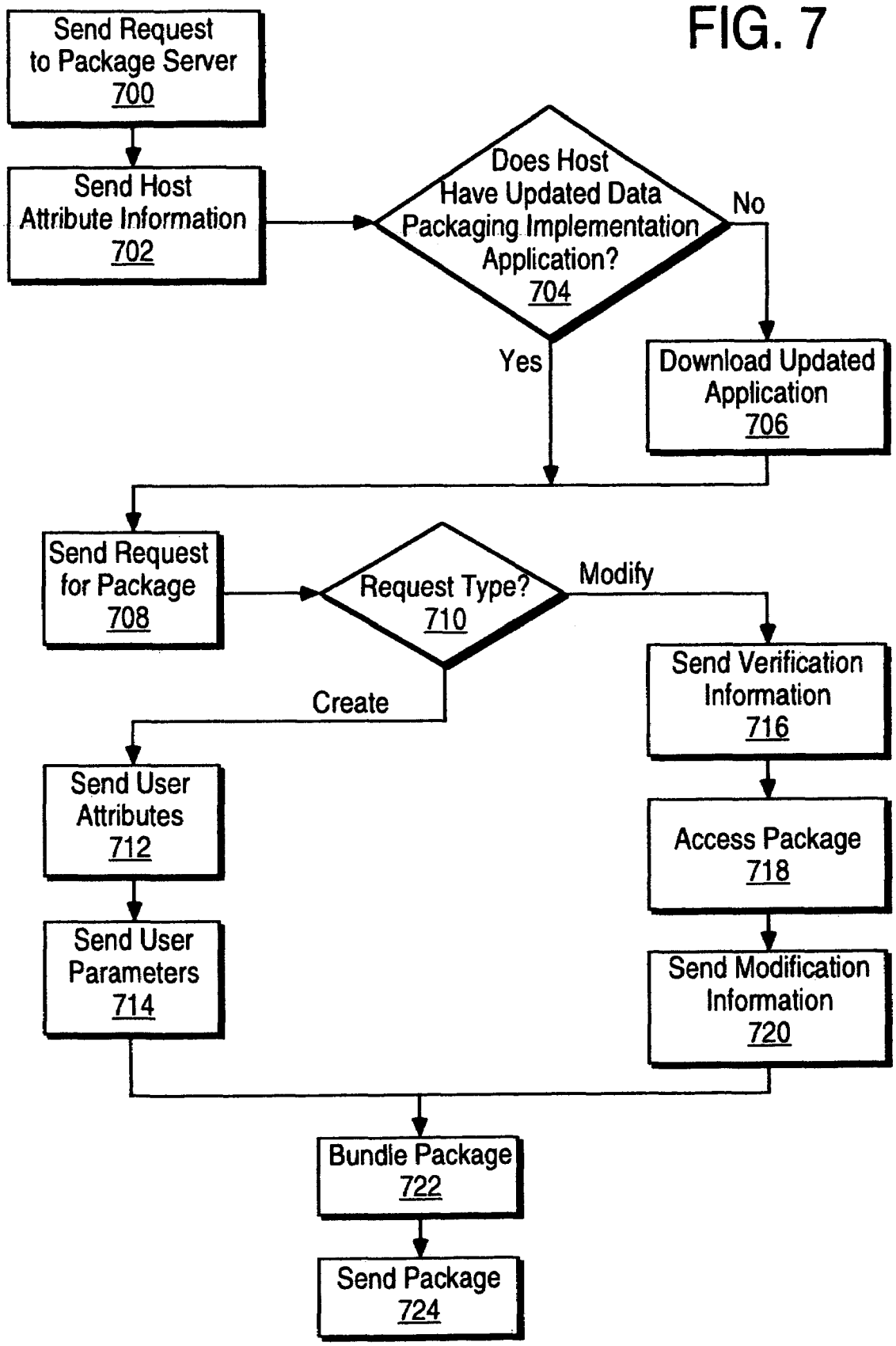
FIG. 7 is a flow diagram illustrating a method of creating modifying a viewer package in accordance with the invention.

Referring to FIG. 7, an illustration of accessing the package server from the host user's point of view is illustrated. In the first step 700, the host user sends a request to the package server to access a viewer package. Along with the request, a host user sends attribute information in step 702. The server then queries whether a host has an updated revision of the data packaging implementation application in step 704. If the host user does not, the server downloads an updated revision of the application in step 706. A request for a viewer package is then sent in step 708. The server then determines whether the request is a request to modify an existing viewer package or a request to create a new viewer package. If a request is to create a new viewer package, the process proceeds to step 712 where the host user sends a client user's attributes to identify the client user that will receive the viewer package. Next, in step 714, the host user will set the parameters under which the client user may access the data. The server then allows the host user to bundle the viewer package in step 722 and send the viewer package to a client user in step 724. If the request is to modify an existing viewer package, the host user sends verification information in step 716, which allows a host user to access a particular viewer package. Once verified, the host user may access the viewer package in step 718 and send the modification information in step 720. The viewer package can then be bundled in step 722 and sent to a client user in step 724.

Figure 8:
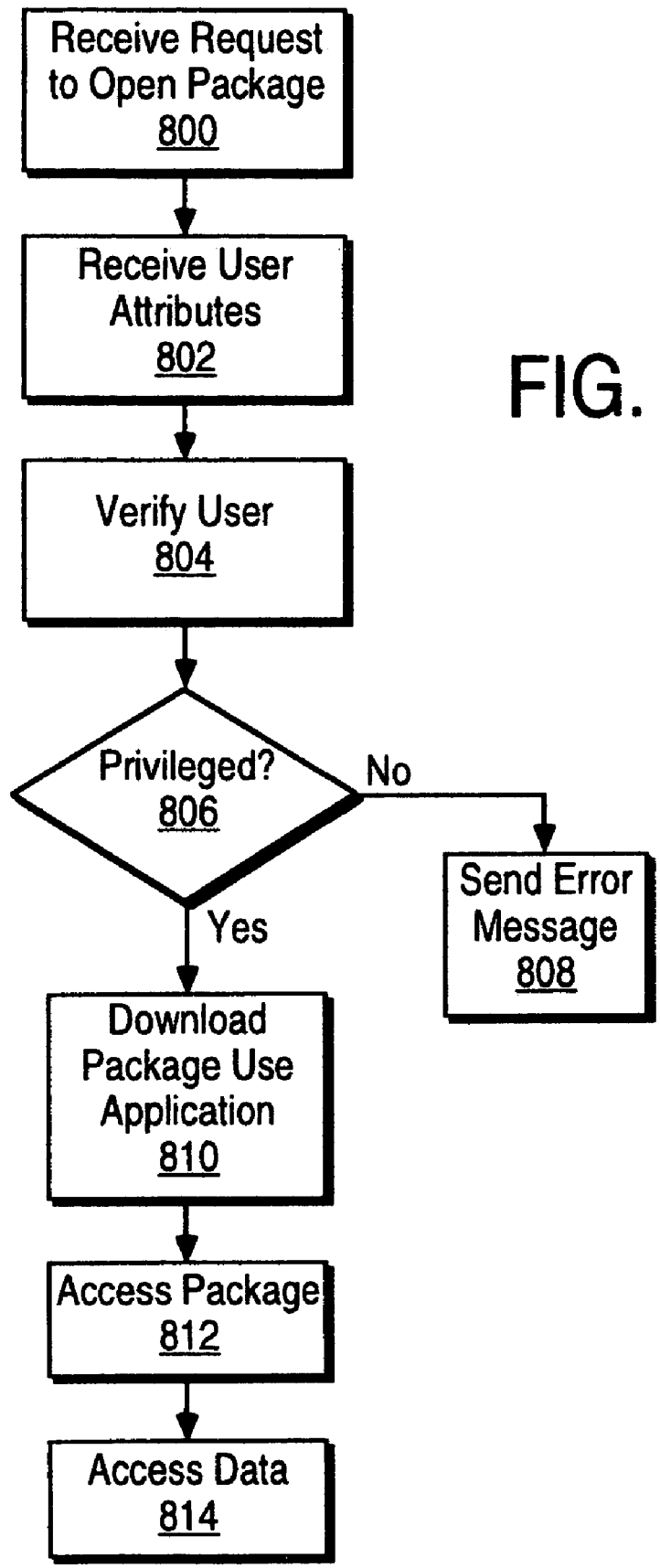
FIG. 8 is a flow diagram illustrating a method of reading a viewer package in accordance with the invention.
Figure 11:
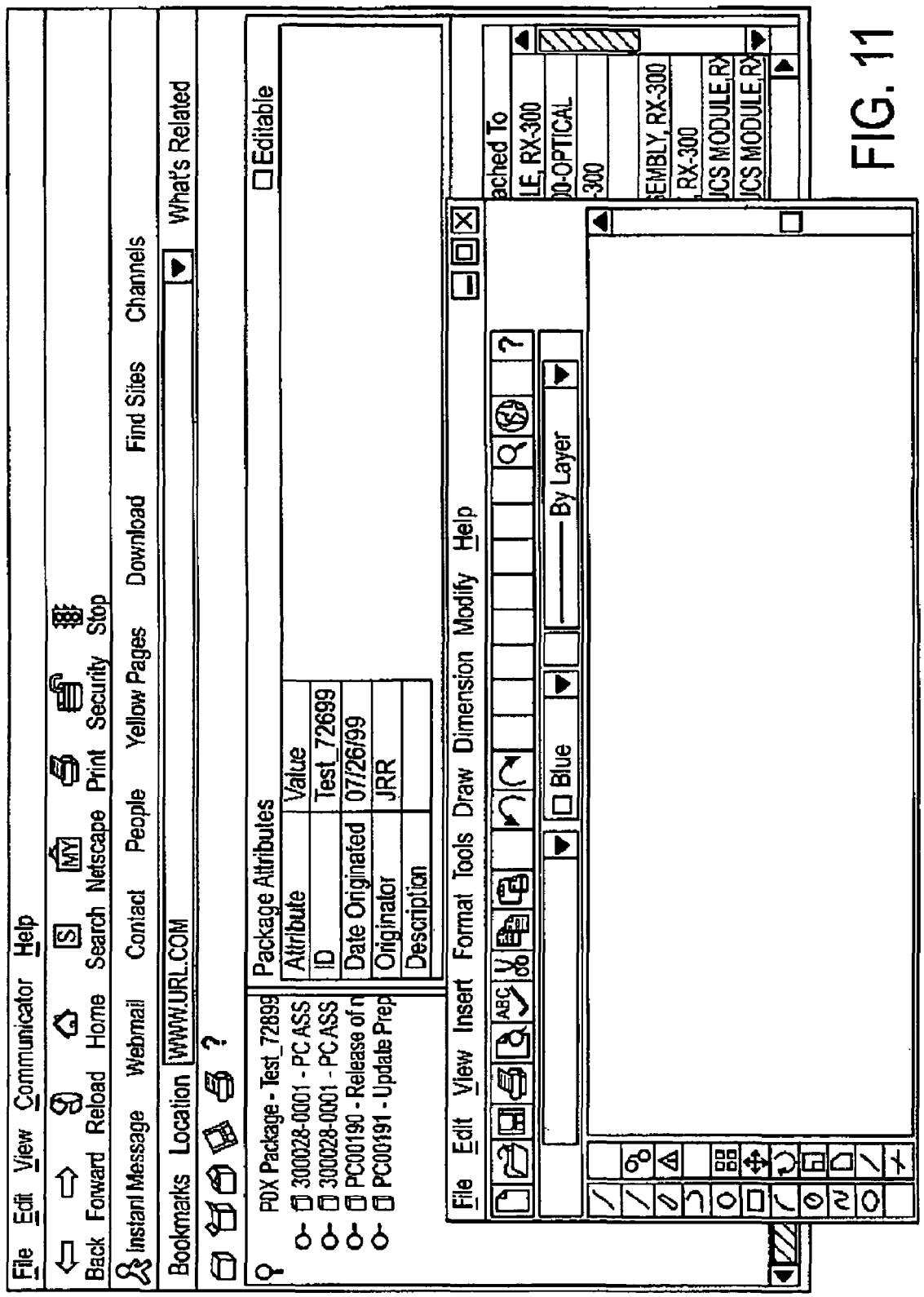

From the package-servers' point of view, FIG. 8 illustrates the steps in which a test user would access a package and associated data. First, in step 800, the server would receive requests from a client user to open a package. This presumes that a package was originally sent to the client user along with associated data. In step 802 the server would receive the client user's attributes that identify the client user. In step 804 the user's identity is verified before it is given access to the package. Next, the server queries whether the client user is privileged to access the package in step 806. If the client user is not, an error message is sent in step 808. If the client user is privileged, the server downloads the package use application in step 810, which allows the client user to access the package in step 812 and to access data associated with the package in step 814.

FIGS. 9–12 illustrate a user interface that is accessible by a client user having access to the package and its associated data. FIG. 9 illustrates a package having object tabs 902 that illustrate different blocks of information associated with the tabs. The information displayed under each tab is visible by a user when the particular tab is chosen by a client user using a cursor. A bill of materials (BOM) is illustrated and lists separate objects 904 that pertain different parts of a product. In the first row 906, the item numbers along with their separate objects are listed. In the second row 908, the number of total revisions that have occurred for that particular object and the related information is illustrated. For example, the first part No. 300028-0001 has been revised twice. In row 910, a description of the part and its contents is displayed. This information may be parsed out from a database using a package code made up of a combination of XML and Java program codes to give the functionality as described herein.

Figure 13:
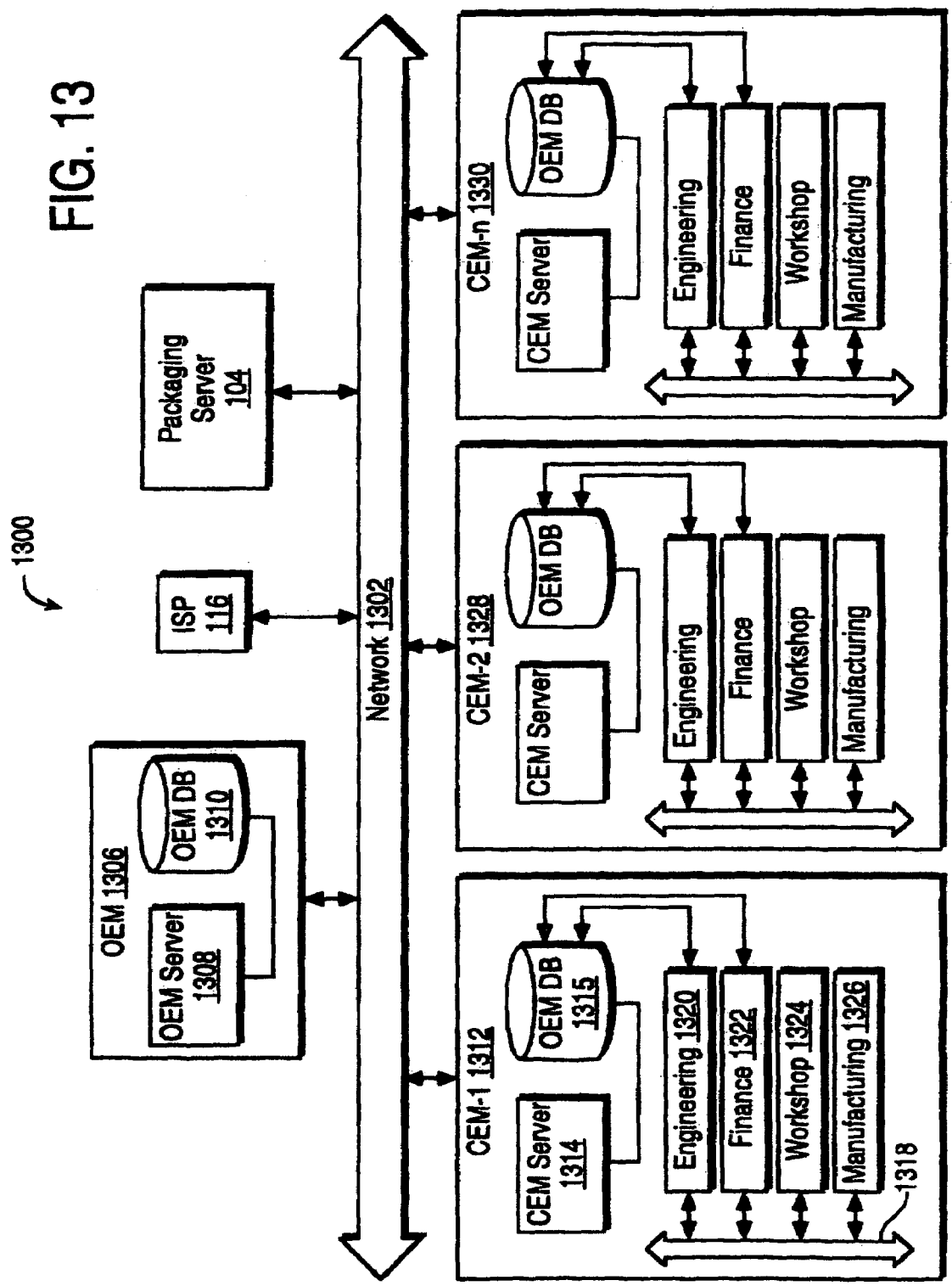
FIG. 13 is a block diagram of a business model of a product manufacturing business in accordance with the invention.

FIG. 13 illustrates a business model 1300 for a product development system embodying the invention. Business model 1300 includes a network 1302 for interconnecting separate entities-within the business structure. These business entities include business partners and other Internet entities necessary for transferring and exchanging information. The system includes packaging server 104, as described in connection with FIG. 3, for allowing a host system to create and send user packages within the business model. The system further includes ISP 116 for providing entities that are connected to the network 1302 with access to the Internet. OEM 1306 is connected to the network and includes an OEM server 1308 connected to an OEM database 1310. CEM-1 1312 is connected to the network 1302 and illustrates an example of a product manufacturer. CEM-1 includes a CEM server 1314 connected to CEM database 1316. The CEM database 1316 includes information pertaining to the development and production of a product. CEM server 1314 is connected to internal network 1318 to provide intercommunication with different departments of the CEM-1. These departments include engineering system 1320, finance system 1322, workshop system 1324 and manufacturing system 1326. Each of these internal systems are electronically connected to each other via the network 1318 for exchanging and sharing information related to a product development and manufacturing process. In a typical production process, different departments of the CEM have different needs with respect to exchanging data. For example, both engineering and finance would need constant updates of information as the production process proceeds. Engineering would likely need constant updates of product designs and specifications in order to understand and be constantly aware of the development of a product. Similarly, finance system 1322 may require constant updates and information so that economic data can be constantly updated. Both of these systems would likely need direct access to the CEM database in order to obtain the updated information.

In contrast, the workshop system 1324 and manufacturing system 1326 may not need constant access to data. These two systems typically work under the guise of engineering, finance and other systems. Therefore, the workshop and manufacturing systems would not need constant access to the database but would need data from the database exchanged with them. Utilizing the invention as discussed above, a viewer package could be sent from any of the other departments including, engineering and finance, to the workshop or manufacturing process to give each of these systems a snapshot of the data located in the database 1316. This is an example of an internal use of the invention. In operation, CEM server 1314 would access packaging server 104 and assemble a viewer package according to the invention. This package can be sent to any of the departments within CEM-1 to be opened and utilized. The receiving department, workshop, manufacturing or any other department, would then access the packaging server 104 to download code necessary to view or otherwise consume the package. The department sending the data package could govern the extent to which the receiving department or system can use the viewer package. The result is a dynamic and robust system for exchanging data within the CEM.

In another business model, the OEM server 1308 could access the packaging server 104 via the network 1302 and create a package to send to CEM-1 1312. In this operation, the OEM server 1308 would access the packaging server 104 and download code necessary to create a viewer package. OEM server 1308 would access OEM database 1310 to import data into a viewer package. The package could then be sent to CEM 1 either directly through network 1302 or via ISP 116, through the Internet, to send the viewer package to CEM-1. This package could be sent directly to either of the systems 1320–1326 or could be sent to the CEM server 1314 for dissemination among the individual departments. The system that then opens and consumes the package would then access the package server 104 via the internet.

In another business model CEM 1, or any department within CEM 1, can send a return package to OEM 1306 by accessing packaging server 104, packaging a viewer package, and sending the package to OEM 1306. In this operation, one of the systems within CEM-1 1312 would download code from packaging server 104 of network 1302, but is necessary to create a package. A package would then be created and sent via the network back to OEM 1306 for use.

Similarly, other packages can be sent within the system among OEM 1306, CEM-1 1312 CEM-2 1328 and CEM-n 1330 according to the invention. Any number of participants can be included in a system. And, data and attached documents can be exchanged among business partners who simply have access to the network.

The invention is intended as a method and apparatus for exchanging data in a platform independent manner and for access to that data in a manner that obviates common database functions commonly required b a database. The system allows a client access to a viewer package established by a host user and allows a host user to control the access of the document by client users according to specific privileges. These privileges can include the ability to read information contained in an object and to possibly redact sections so that a client user cannot read all of the data contained therein. The viewer package and its use by execution of viewer code allow access to a type of snap-shot of a database, without the need for actual access to a database. The privileges are established within the viewer code and can further allow a client user to modify an object and other associated information by adding or deleting information, again, according to the privileges established by the host. Although this embodiment is described and illustrated in the context of a product development business relationship, the scope of the invention extends to other applications where convenient and efficient data access is required. The use of documents such as bills of material (BOMs), change orders, purchase orders and other business documents could be streamlined and even obviated using such a system. Furthermore, while the foregoing description has been with reference to particular embodiments of the invention, it will be appreciated that these are only illustrative of the invention and the changes may be made to those embodiments without departing from the principles of invention, the scope of which is defined by the appended claims.

The invention claimed is:

1. A computer implemented method for creating an electronic data viewer package for use in the transaction of business product information between a data owner and a registered user; comprising:
   preparing a platform independent viewer package by the data owner, wherein the viewer package includes product information data owned by the data owner and to be accessed by at least one registered user of the viewer package according to predetermined user access criteria;
   identifying at least one attribute associated with the registered user of the viewer package;
   identifying at least one function that the at least one registered user of the viewer package is permitted to perform based on predetermined user access criteria;
   retrieving the viewer package by the data owner from a database and generating the viewer package in a structure corresponding to a structure of the data in the database and based on the at least one attribute associated with the registered user, said attribute identifying controlled access to the data by a registered user according to predetermined privileges set by the owner of the data, wherein the viewer package allows the registered user located in a remote location to perform the at least one function in a manner that remotely emulates a database for viewing, consuming, and manipulating data retrieved from within the viewer package and in a manner that is independent from direct access to the database; and
   transferring the viewer package and application code to the registered user to allow the registered user access to a virtual copy of the data as it resides in the database, where the data in the viewer package may be accessed by a registered user in a remote location and in a manner that remotely emulates controlled access to a database that is independent from direct access to the database from which the viewer package was prepared.

2. The method of claim 1 further comprising:
   transferring application code to the registered user; and
   the registered user executing the application code to perform at least one function on the data in the viewer package.

3. A computer implemented method for creating an electronic data viewer package for use in the transaction of business information between a data owner and a regstered user; comprising:
   preparing a viewer package containing a virtual and platform independent copy of a data owner's product information data from a database having a data structure that, when used by a registered user emulates the structure of a database, and application code to view the virtual copy of the data, wherein the request identifies at least one registered user that will access the data contained in the viewer package from a remote location and independent from any direct access to the database, and wherein the preparation is provided to a server configured to generate the viewer package based on the identity and at least one attribute of the at least one registered user said attribute identifying controlled access to viewer package data by the at least one registered user according to predetermined privileges set by an owner of the data;
   receiving the viewer package wherein the viewer data in the viewer package has a structure that corresponds to the data structure of data in the database from which the viewer package was prepared;
   receiving the application program; and
   executing the application program, wherein the application program allows the registered user to access at least a portion of the data contained in the viewer package in a manner that emulates a database for viewing, consuming, and manipulating a virtual copy of the database data from within the view package in a remote location according the predetermined access criteria assigned to the registered user and in a manner that remotely emulates access to a database in a manner that is independent from direct access to the database.

4. The method of claim 3 wherein the viewer package identifies functions that may be performed by the registered user with respect to the data contained in the viewer package.

5. An apparatus comprising:
   a memory device configured to store a data packaging management application, wherein the data packaging management application is configured to generate a viewer package for use in the transaction of business product information between a data owner and a registered user; wherein the viewer package is platform independent and based on at least one attribute associated with a registered user of the viewer package said attribute identifying controlled access to product information data by a registered user according to predetermined privileges set by an owner of the data, and wherein the viewer package contains a virtual copy derived from data located in a remote database and having a data structure to be accessed by the registered user and application code to be downloaded to and used by the registered user to view the data in a remote location, said data being a virtual copy of data located in the database and being downloaded with a data structure corresponding to the data structure of the database; and a processor coupled to the memory device and configured to execute the data packaging management application including the application code downloaded to the registered user, wherein execution of the data packaging management application allows the registered user to perform at least one function associated with the data from within the viewer package and application code contained in the viewer package according to predetermined access criteria in a manner that emulates a database for viewing, consuming, and manipulating a virtual copy of data within the viewer package in a remote location and in a manner that remotely emulates access to a database that is independent from direct access to the database.

6. The apparatus of claim 5 wherein the data packaging management application is further configured to retrieve data from a database and stores the data in the viewer package in a data structure corresponding to the data structure of the database.

7. The apparatus of claim 6 wherein the data is retrieved from the database based on the at least one attribute associated with the registered user.

8. The apparatus of claim 5 wherein the at least one function the registered user is allowed to perform on the downloaded data with the downloaded application code is based on the at least one attribute associated with the registered user.

9. A computer implemented method for storing, packaging, and transferring business product information data among requesters with different access levels whereby access to items of data is limited to particular requesters comprising:

preparing a platform indeptendent viewer package by an owner of the data, wherein the viewer package includes product information data derived from a database and packaged in a manner for it be accessed by a registered user of the viewer package according to user access criteria;

identifying at least one attribute associated with the registered user of the viewer package;

identifying at least one function that the registered user of the viewer package is permitted to perform;

retrieving the viewer package from a database and generating a platform independent viewer package therefrom in an XML structure corresponding to a structure of the data in the database and based on the at least one attribute associated with the registered user, said attribute identifying controlled access to the data by a registered user according to predetermined privileges set by an owner of the data, wherein the viewer package contains URL links embedded inside of a document to contain objects and code for a Java run-time environment, said URL links representing functionality to process XML document tags, said URL links including Java code for downloading via a URL class loader mechanism contained in a Java platform, whereby once class byte codes are downloaded class object and temporary object instances are created and used to evaluate the information contained inside the XML document whereby the viewer package allows a registered user to perform the at least one function in a manner that remotely emulates a database for viewing, consuming, and manipulating data retrieved from within the viewer package and in a manner that is independent from direct access to the database; and transferring the platform independent viewer package including application code to the registered user to allow the registered user access to the data in the platform independent viewer package in a remote location and in a manner that remotely emulates access to a database that is independent from direct access to the database.

10. A computer implemented method for storing, packaging, and transferring business product information data among requesters with different access levels comprising:

preparing platform independent viewer package wherein the request is provided to a server configured to generate the viewer package based on the identity and at least one attribute of the registered user said attribute identifying controlled access to the data by the registered user according to predetermined privileges set by an owner of the data, said platform independent viewer package containing product information data from a database having a data structure, and application code to view the data, the data in the platform independent viewer package having an XML structure corresponding to a structure of the data in the database and based on at least one attribute associated with the registered user, said attribute identifying controlled access to the data by a registered user according to predetermined privileges set by an owner of the data, wherein the viewer package further contains URL links embedded inside of an XML document to contain objects and code for a Java run-time environment, said URL links representing functionality to process XML document tags, said URL links including Java code for downloading via a URL class loader mechanism contained in a Java platform, whereby once class byte codes are downloaded class object and temporary object instances are created and used to evaluate the information contained inside the XML document whereby the viewer package allows a registered user to perform the at least one function in a manner that emulates a database for viewing, consuming, and manipulating a virtual copy of the database data independent from direct access to the database;

receiving the viewer package including the XML document and the Java code application program in a remote location; and executing the Java code application program, wherein the Java code application program allows the registered user to access at least a portion of the XML data contained in the viewer package in a manner that remotely emulates a database for viewing, consuming, and manipulating the XML data retrieved from within the viewer package and in a manner that is independent from direct access to the database.

* * * * *